(12) United States Patent
Chung

(10) Patent No.: US 6,886,788 B1
(45) Date of Patent: May 3, 2005

(54) DUAL-USE SUPPORT RACK ASSEMBLY

(76) Inventor: Kiosky Chung, 8F-1, No. 497, Jhongming S. Rd., West District, Taichung City 403 (TW)

( * ) Notice: Subject to any disclaimer, the term of this patent is extended or adjusted under 35 U.S.C. 154(b) by 23 days.

(21) Appl. No.: 10/728,770

(22) Filed: Dec. 8, 2003

(51) Int. Cl.[7] ............................................. F16M 11/00

(52) U.S. Cl. .................................................. 248/176.2

(58) Field of Search ........................... 248/346.06, 146, 248/149, 161, 176.1, 176.2, 127, 132; 126/305, 126/304 A

(56) References Cited

U.S. PATENT DOCUMENTS

| | | | | |
|---|---|---|---|---|
| 2,226,925 A | * | 12/1940 | Ehret | 126/39 R |
| 2,352,558 A | * | 6/1944 | Minar | 126/242 |
| 5,513,825 A | * | 5/1996 | Gutgsell | 248/188.5 |

* cited by examiner

Primary Examiner—Ramon O Ramirez
(74) Attorney, Agent, or Firm—Charles E. Baxley

(57) ABSTRACT

A support rack assembly includes a base, and a support seat adjustably mounted on the base. The support seat is movable relative to the base so as to adjust a distance between the support seat and the base, thereby adjusting the height of the support rack assembly. Thus, the support rack assembly is both available for a barbecue stove and a warming stove.

9 Claims, 8 Drawing Sheets

DUAL-USE SUPPORT RACK ASSEMBLY

BACKGROUND OF THE INVENTION

1. Field of the Invention

The present invention relates to a support rack assembly, and more particularly to a dual-use support rack assembly both available for a barbecue stove and a warming stove.

2. Description of the Related Art

A warming stove has a greater height so that it includes a support rack having a smaller height, and a barbecue stove has a smaller height so that it includes a support rack having a greater height. However, the conventional support rack is not both available for a barbecue stove and a warming stove, thereby greatly limiting the versatility of the conventional support rack.

SUMMARY OF THE INVENTION

The primary objective of the present invention is to provide a dual-use support rack assembly both available for a barbecue stove and a warming stove.

Another objective of the present invention is to provide a support rack assembly that can be assembled easily and conveniently.

A further objective of the present invention is to provide a support rack assembly that can be operated easily and conveniently, thereby facilitating the user operating the support rack assembly.

In accordance with the present invention, there is provided a support rack assembly, comprising a base, and a support seat adjustably mounted on the base, wherein:

the base has a top face having a center formed with a cylindrical barrel extended upward, the barrel of the base has a periphery formed with a plurality of upright guide tracks each extended along a longitudinal direction of the barrel of the base, each of the guide tracks of the barrel has an uppermost portion formed with an arcuate limit slot extended downward in an oblique manner;

the support seat has a periphery formed with a plurality of screw bores each aligning with a respective one of the guide tracks of the barrel, and the support rack assembly further comprises a plurality of adjusting screws each extended through a respective one of the guide tracks of the barrel and each screwed into a respective one of the screw bores of the support seat, so that the support seat is locked on the barrel of the base.

Further benefits and advantages of the present invention will become apparent after a careful reading of the detailed description with appropriate reference to the accompanying drawings.

DETAILED DESCRIPTION OF THE INVENTION

Figure 1:
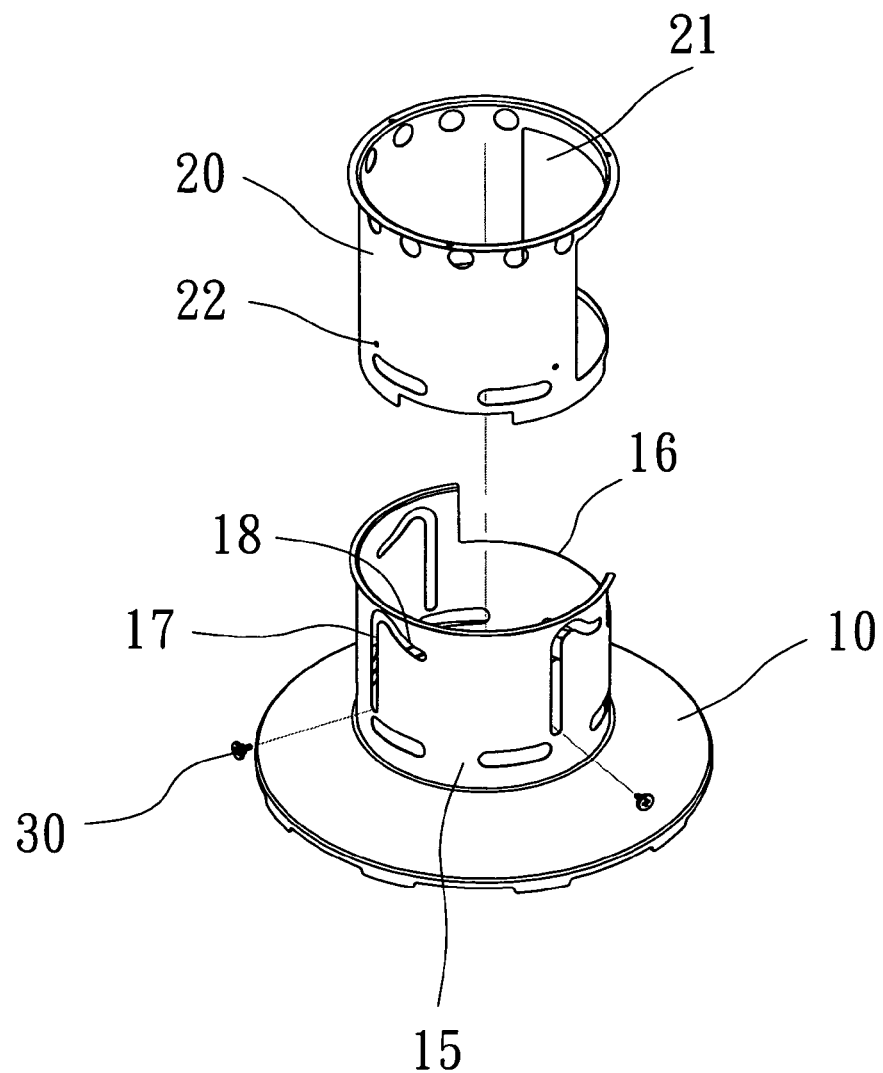
FIG. 1 is an exploded perspective view of a support rack assembly in accordance with the preferred embodiment of the present invention.

Referring to the drawings and initially to FIGS. 1–4, a dual-use support rack assembly in accordance with the preferred embodiment of the present invention comprises a base 10, and a support seat 20 adjustably mounted on the base 10.

The base 10 has a top face having a center formed with a cylindrical barrel 15 extended upward. The barrel 15 of the base 10 has a periphery formed with a plurality of upright guide tracks 17 each extended along a longitudinal direction of the barrel 15 of the base 10. Each of the guide tracks 17 of the barrel 15 has an uppermost portion formed with an arcuate limit slot 18 extended downward in an oblique manner. The periphery of the barrel 15 of the base 10 is formed with an opening 16 extended to a top of the barrel 15 of the base 10.

The support seat 20 is movable relative to the base 10 so as to adjust the distance between the support seat 20 and the base 10, thereby adjusting the height of the support rack assembly. The support seat 20 has a periphery formed with a plurality of screw bores 22 each aligning with a respective one of the guide tracks 17 of the barrel 15, and the support rack assembly further comprises a plurality of adjusting screws 30 each extended through a respective one of the guide tracks 17 of the barrel 15 and each screwed into a respective one of the screw bores 22 of the support seat 20, so that the support seat 20 is locked on the barrel 15 of the base 10. The periphery of the support seat 20 is formed with an opening 21 aligning with the opening 16 of the barrel 15 of the base 10. Preferably, each of the screw bores 22 of the support seat 20 is located at a lower portion of the support seat 20.

Figure 4:
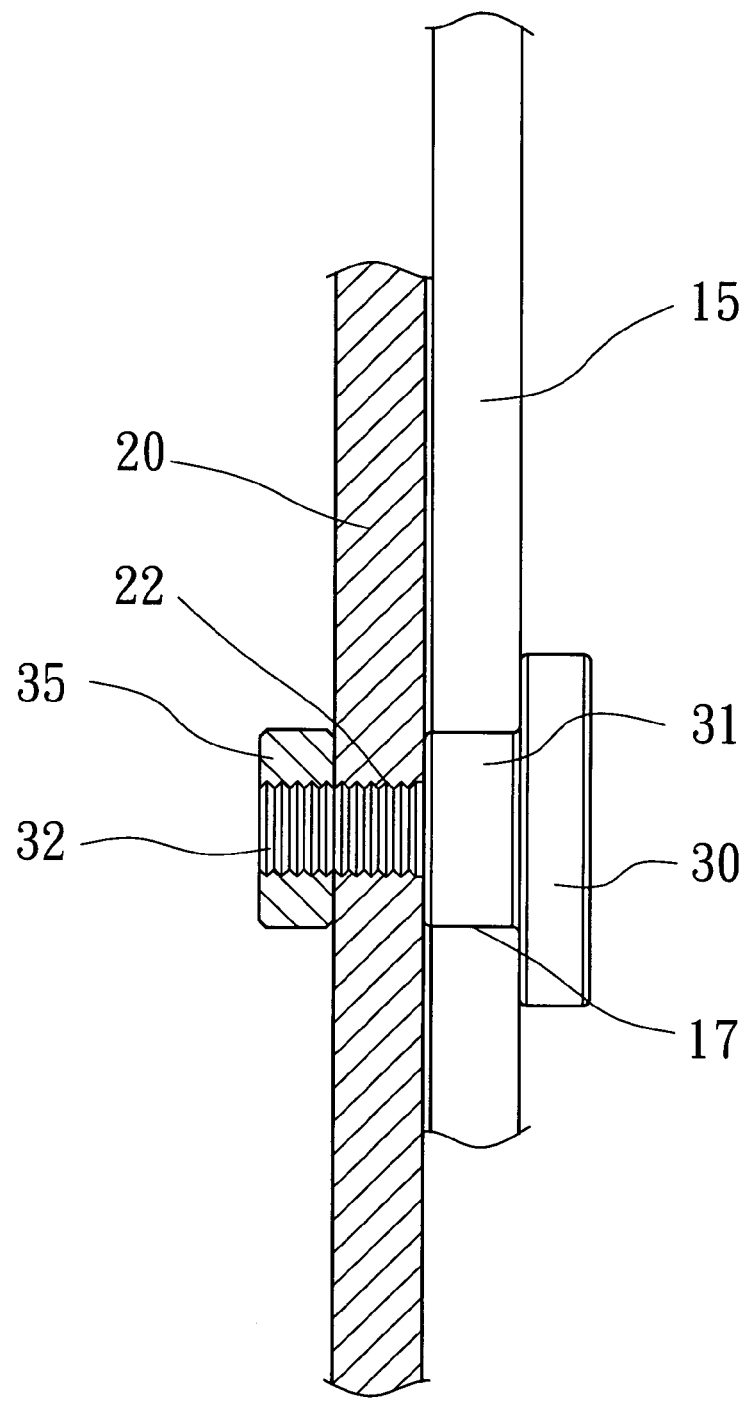
FIG. 4 is a plan cross-sectional view of the support rack assembly as shown in FIG. 2.

As shown in FIG. 4, each of the adjusting screws 30 includes a slide 31 slidably mounted in a respective one of the guide tracks 17 of the barrel 15, and a threaded rod 32 extended from a distal end of the slide 31 and screwed into a respective one of the screw bores 22 of the support seat 20. The support rack assembly further comprises a plurality of locking nuts 35 each screwed on the threaded rod 32 of a respective one of the adjusting screws 30 and each rested on an inner wall of the support seat 20. Thus, the support seat 20 is movable relative to the base 10 by moving the adjusting screws 30 so as to adjust the distance between the support seat 20 and the base 10, thereby adjusting the height of the support rack assembly.

Figure 2:
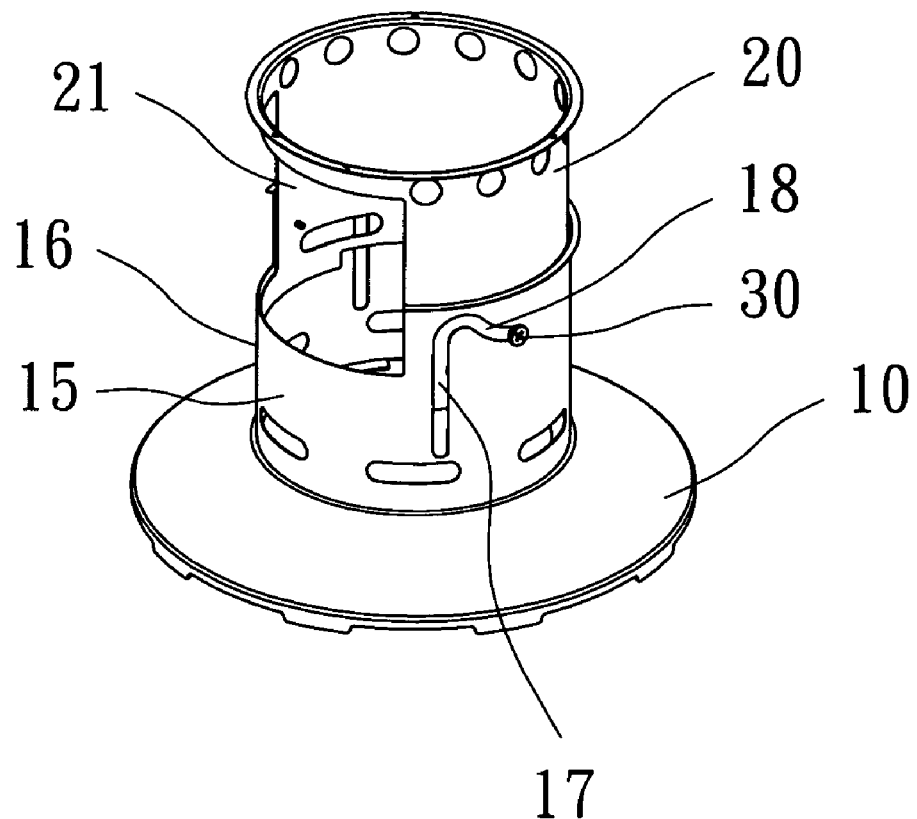
FIG. 2 is a perspective assembly view of the support rack assembly in accordance with the preferred embodiment of the present invention.
Figure 3:
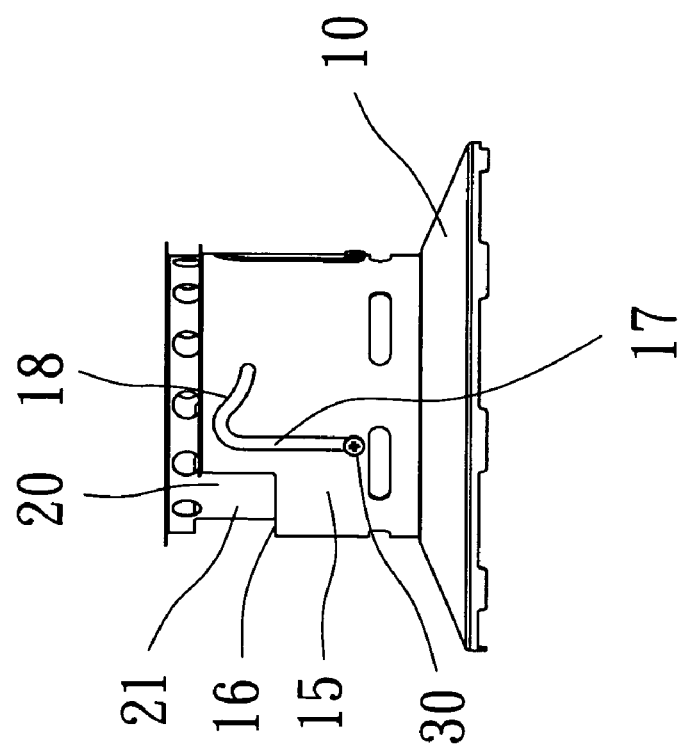
FIG. 3 is a plan view of the support rack assembly as shown in FIG. 2.
Figure 7:
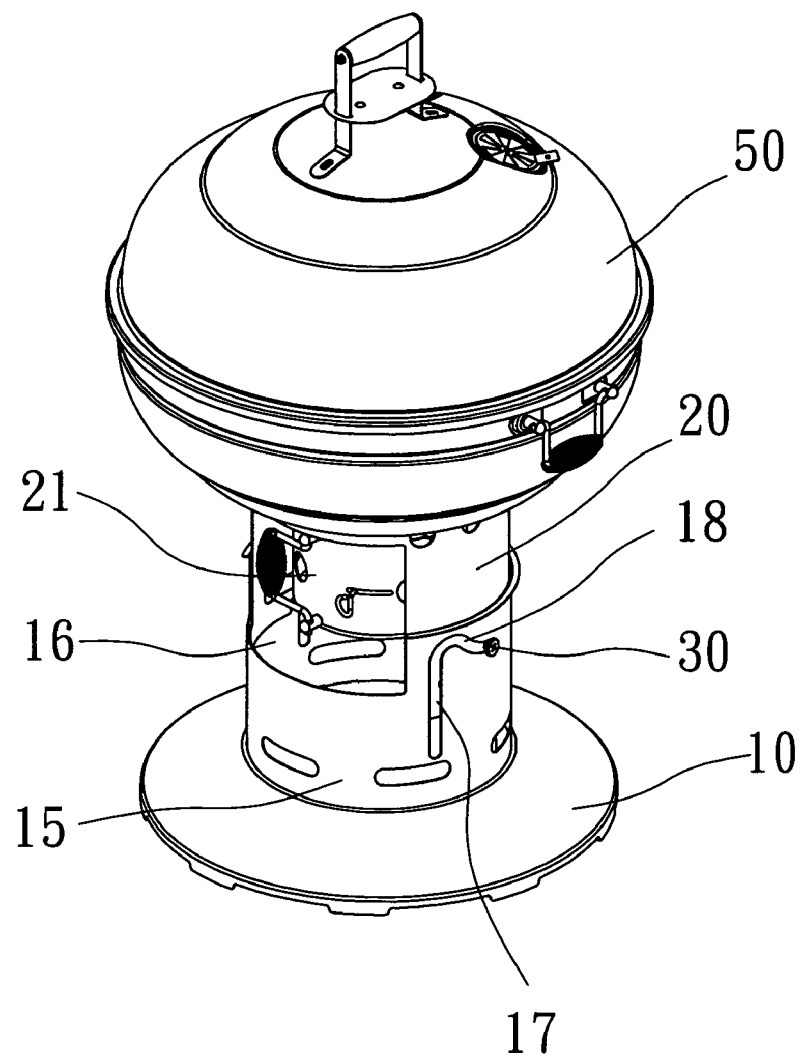
FIG. 7 is a perspective assembly view showing the support rack assembly being used for a barbecue stove.
Figure 8:
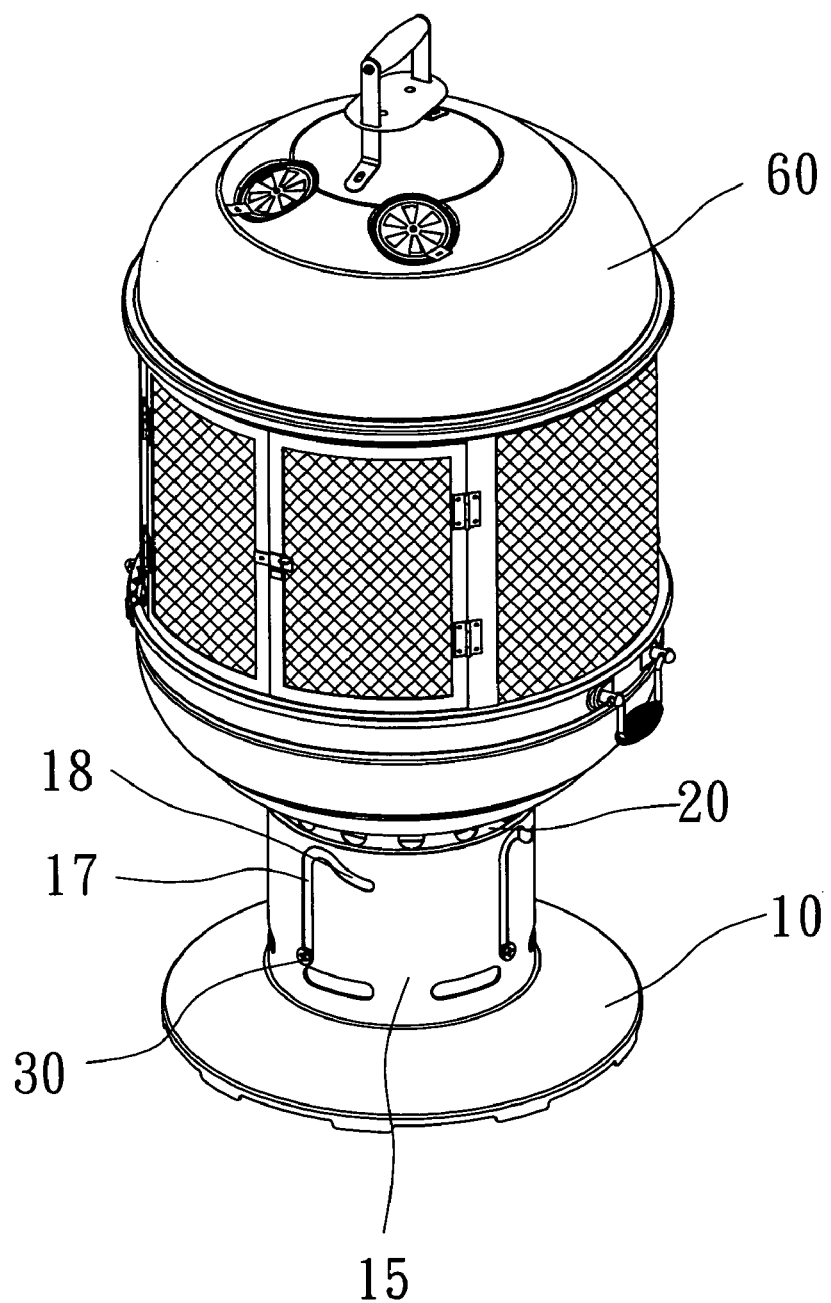
FIG. 8 is a perspective assembly view showing the support rack assembly being used for a warming stove.

In operation, referring to FIGS. 1–8, the support seat 20 is moved downward relative to the base 10 by moving the adjusting screws 30 downward, so that each of the adjusting screws 30 is moved to the lowermost portion of a respective one of the guide tracks 17 of the barrel 15 as shown in FIG. 3, so as to reduce the height of the support rack assembly, so that the support seat 20 of the support rack assembly is used to support a warming stove 60 having a greater height as shown in FIG. 8.

Figure 5:
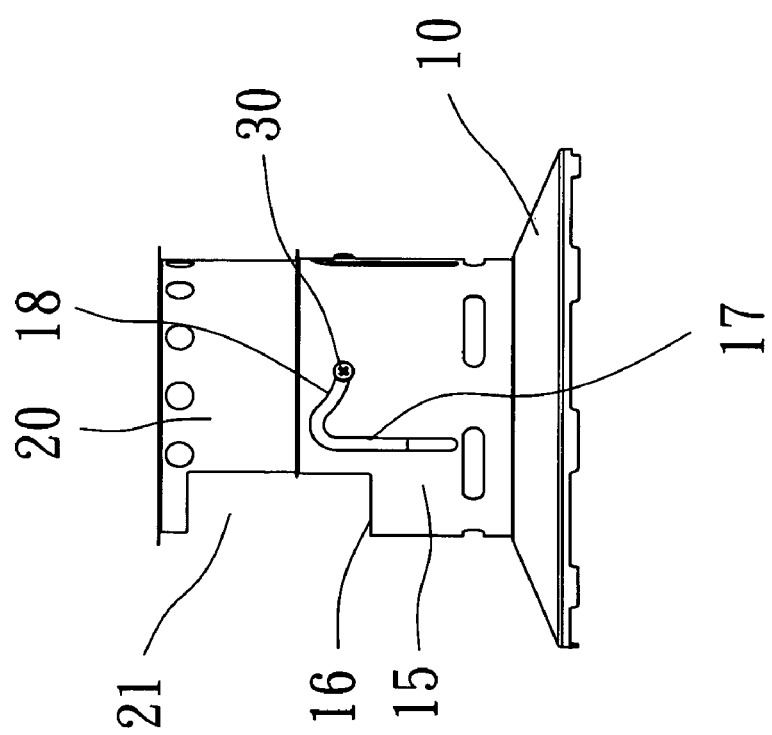
FIG. 5 is a schematic operational view of the support rack assembly as shown in FIG. 3 in adjustment.
Figure 6:
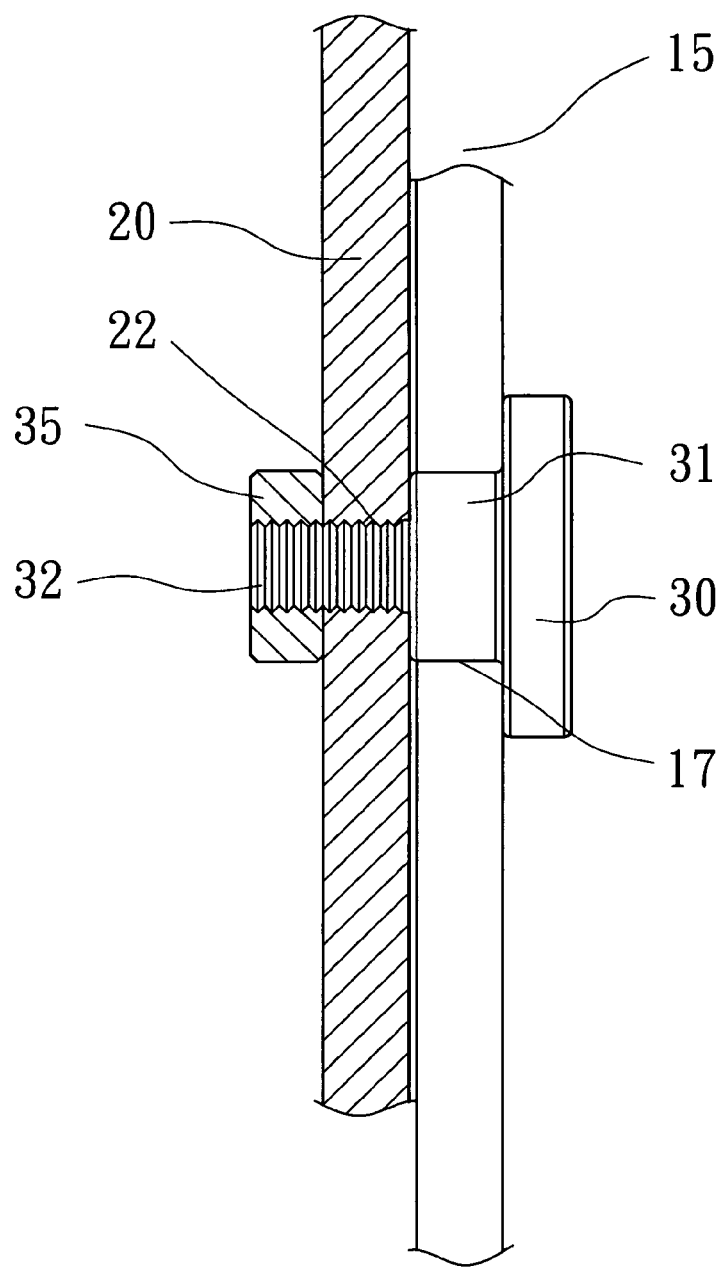
FIG. 6 is a schematic operational view of the support rack assembly as shown in FIG. 4 in adjustment.

Alternatively, the support seat 20 is moved upward relative to the base 10 by moving the adjusting screws 30 upward, so that each of the adjusting screws 30 is moved to the uppermost portion of a respective one of the guide tracks 17 of the barrel 15 and is moved into and locked in the respective limit slot 18 as shown in FIGS. 2 and 5, so as to increase the height of the support rack assembly, so that the support seat 20 of the support rack assembly is used to support a barbecue stove 50 having a smaller height as shown in FIG. 7.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A support rack assembly, comprising a base, and a support seat adjustably mounted on the base, wherein:
   the base has a top face having a center formed with a cylindrical barrel extended upward, the barrel of the base has a periphery formed with a plurality of upright guide tracks each extended along a longitudinal direction of the barrel of the base, each of the guide tracks of the barrel has an uppermost portion formed with an arcuate limit slot extended downward in an oblique manner;
   the support seat has a periphery formed with a plurality of screw bores each aligning with a respective one of the guide tracks of the barrel, and the support rack assembly further comprises a plurality of adjusting screws each extended through a respective one of the guide tracks of the barrel and each screwed into a respective one of the screw bores of the support seat, so that the support seat is locked on the barrel of the base.

2. The support rack assembly in accordance with claim 1, wherein the periphery of the barrel of the base is formed with an opening extended to a top of the barrel of the base.

3. The support rack assembly in accordance with claim 2, wherein the periphery of the support seat is formed with an opening aligning with the opening of the barrel of the base.

4. The support rack assembly in accordance with claim 1, wherein each of the screw bores of the support seat is located at a lower portion of the support seat.

5. The support rack assembly in accordance with claim 1, wherein each of the adjusting screws includes a slide slidably mounted in a respective one of the guide tracks of the barrel, and a threaded rod extended from a distal end of the slide and screwed into a respective one of the screw bores of the support seat.

6. The support rack assembly in accordance with claim 5, further comprising a plurality of locking nuts each screwed on the threaded rod of a respective one of the adjusting screws and each rested on an inner wall of the support seat.

7. The support rack assembly in accordance with claim 1, wherein the support seat is movable relative to the base by moving the adjusting screws so as to adjust a distance between the support seat and the base, thereby adjusting the height of the support rack assembly.

8. The support rack assembly in accordance with claim 1, wherein the support seat is moved downward relative to the base by moving the adjusting screws downward, so that each of the adjusting screws is moved to the lowermost portion of a respective one of the guide tracks of the barrel, so as to reduce the height of the support rack assembly.

9. The support rack assembly in accordance with claim 1, wherein the support seat is moved upward relative to the base by moving the adjusting screws upward, so that each of the adjusting screws is moved to the uppermost portion of a respective one of the guide tracks of the barrel and is moved into and locked in the respective limit slot, so as to increase the height of the support rack assembly.

* * * * *